US011449450B2

(12) United States Patent
Lin et al.

(10) Patent No.: US 11,449,450 B2
(45) Date of Patent: Sep. 20, 2022

(54) PROCESSING AND STORAGE CIRCUIT

(71) Applicant: RAYMX Microelectronics Corp., Hefei (CN)

(72) Inventors: Shuai Lin, Hefei (CN); Yu Zhang, Hefei (CN)

(73) Assignee: RAYMX MICROELECTRONICS CORP., Hefei (CN)

( * ) Notice: Subject to any disclaimer, the term of this patent is extended or adjusted under 35 U.S.C. 154(b) by 63 days.

(21) Appl. No.: 17/139,004

(22) Filed: Dec. 31, 2020

(65) Prior Publication Data

US 2022/0156210 A1 May 19, 2022

(30) Foreign Application Priority Data

Nov. 18, 2020 (CN) .......................... 202011297099.8

(51) Int. Cl.
*G06F 13/374* (2006.01)
*G06F 13/40* (2006.01)
*G06F 15/78* (2006.01)

(52) U.S. Cl.
CPC ........ *G06F 13/374* (2013.01); *G06F 13/4031* (2013.01); *G06F 13/4054* (2013.01); *G06F 15/7807* (2013.01)

(58) Field of Classification Search
CPC ............... G06F 13/374; G06F 13/4031; G06F 13/4054; G06F 15/7807
See application file for complete search history.

(56) References Cited

U.S. PATENT DOCUMENTS

| 8,055,872 | B2 * | 11/2011 | Biles | G06F 13/1668 |
| | | | | 711/E12.066 |
| 9,274,951 | B2 * | 3/2016 | Evans | G06F 12/0802 |
| 2002/0152060 | A1 | 10/2002 | Tseng | |
| 2006/0064546 | A1 * | 3/2006 | Arita | G06F 9/3824 |
| | | | | 712/E9.046 |
| 2019/0171941 | A1 * | 6/2019 | Quach | G06F 9/5044 |

FOREIGN PATENT DOCUMENTS

| TW | 200802011 A | 1/2008 |
| TW | I541725 B | 7/2016 |
| TW | I610173 B | 1/2018 |
| TW | 202022679 A | 6/2020 |

* cited by examiner

*Primary Examiner* — Brian T Misiura
(74) *Attorney, Agent, or Firm* — McClure, Qualey & Rodack, LLP

(57) ABSTRACT

A processing and storage circuit includes an internal bus, one or more first-level internal memory units, a central processing unit (CPU), one or more hardware acceleration engines, and an arbiter. The first-level internal memory unit is coupled to the internal bus. The CPU includes a second-level internal memory unit, and is configured to access the first-level internal memory unit via the internal bus, and when the CPU accesses data, the first-level internal memory unit is accessed preferentially. The hardware acceleration engine is configured to access the first-level internal memory unit via the internal bus. The arbiter is coupled to the internal bus, configured to decide whether the CPU or the hardware acceleration engine be allowed to access the first-level internal memory unit. The arbiter sets the priority of the CPU accessing the first-level internal memory unit to be over the hardware acceleration engine.

17 Claims, 6 Drawing Sheets

PROCESSING AND STORAGE CIRCUIT

CROSS-REFERENCE TO RELATED APPLICATION

This non-provisional application claims priority under 35 U.S.C. § 119(a) to Patent Application No. 202011297099.8 filed in China, P.R.C. on Nov. 18, 2020, the entire contents of which are hereby incorporated by reference.

BACKGROUND

Technical Field

The present invention relates to a system-on-a-chip (SOC) circuit, and in particular to, a processing and storage circuit applicable to intensive data-access.

Related Art

Among SOC products, various hardware acceleration engines are formulated to assist a central processing unit (CPU) in data processing. FIG. 1 shows that an existing hardware acceleration engine assists a CPU in data processing. When processing data, the hardware acceleration engine needs to access, through a bus, an internal memory which includes a storage address range (for example, the data is temporarily stored in an internal memory in the CPU or stored in an external main memory connected to the bus). The CPU also accesses data through a bus, or through a data access channel in the CPU. This usually depends on the position where the data is stored—whether the data is stored in a cache in the CPU or in the external main memory. Read delay can be reduced when data is stored in the CPU. However, usually, the capacity of the internal memory in the CPU cannot be excessively large. If the SOC is located in a storage device product (for example, a solid-state drive (SSD), or a flash drive) for intensive data-access, the foregoing read delay severely affects the efficiency of the entire storage device product.

It can be learned from FIG. 1 that regardless of whether the data is stored in the internal memory in the CPU, or in the external main memory connected to the bus, the hardware acceleration engine needs to access data through the bus. For a data-access intensive algorithm, both the CPU and the hardware acceleration engine need an access-intensive bus. Most of time is consumed on the delay in a data reading operation on the bus, therefore severely affecting the efficiency of the entire SOC. Besides, for a system in which there are more other circuits on the bus and/or the structure of the bus is more complex, because only when permission to access the bus is obtained, data can be read through the bus, the operation delay is longer. Consequently, the processing cannot be accelerated effectively.

SUMMARY

The present invention provides a processing and storage circuit, including an internal bus, at least one first-level internal memory unit, a CPU, at least one hardware acceleration engine, and an arbiter. The first-level internal memory unit is coupled to the internal bus. The CPU is coupled to the first-level internal memory unit via the internal bus and includes a second-level internal memory unit. The CPU is configured to access the first-level internal memory unit and the second-level internal memory unit, and when the CPU accesses data, the first-level internal memory unit is accessed preferentially. The hardware acceleration engine is coupled to the first-level internal memory unit via the internal bus, configured to access the first-level internal memory unit. The arbiter is coupled to the internal bus, configured to decide whether the CPU or the hardware acceleration engine be allowed to access the first-level internal memory unit. In addition, the arbiter sets the priority of the CPU accessing the first-level internal memory unit to be over the hardware acceleration engine.

In summary, in the present invention, with the access speed of the CPU being ensured, the hardware acceleration engine and the internal memory are tightly coupled in terms of physical implementation, to reduce the time overheads caused when the CPU and the hardware acceleration engine access data, and optimize the delay of a data path, thereby further improving the performance of the hardware acceleration engine.

The following details are illustrated by using specific embodiments with reference to accompanying drawings, so that it is easier to understand the objective, the technical content, and the effects achieved therein.

DETAILED DESCRIPTION

Figure 1:
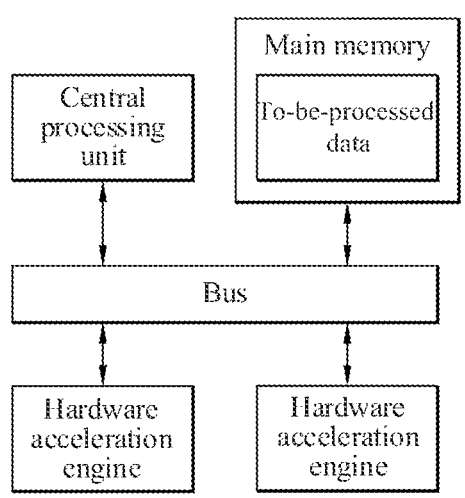
FIG. 1 is a schematic block diagram of a conventional SOC circuit.

Embodiments of the present invention are described with reference to relevant drawings. The same reference numbers in the drawings represent the same or similar components or circuits.

It should be understood that words such as "comprise" and "include" in the specification are used to indicate the presence of particular technical features, values, method steps, job processing and/or components, but do not exclude the addition of more other technical features, values, method steps, job processing, components, or any combination thereof.

Figure 2:
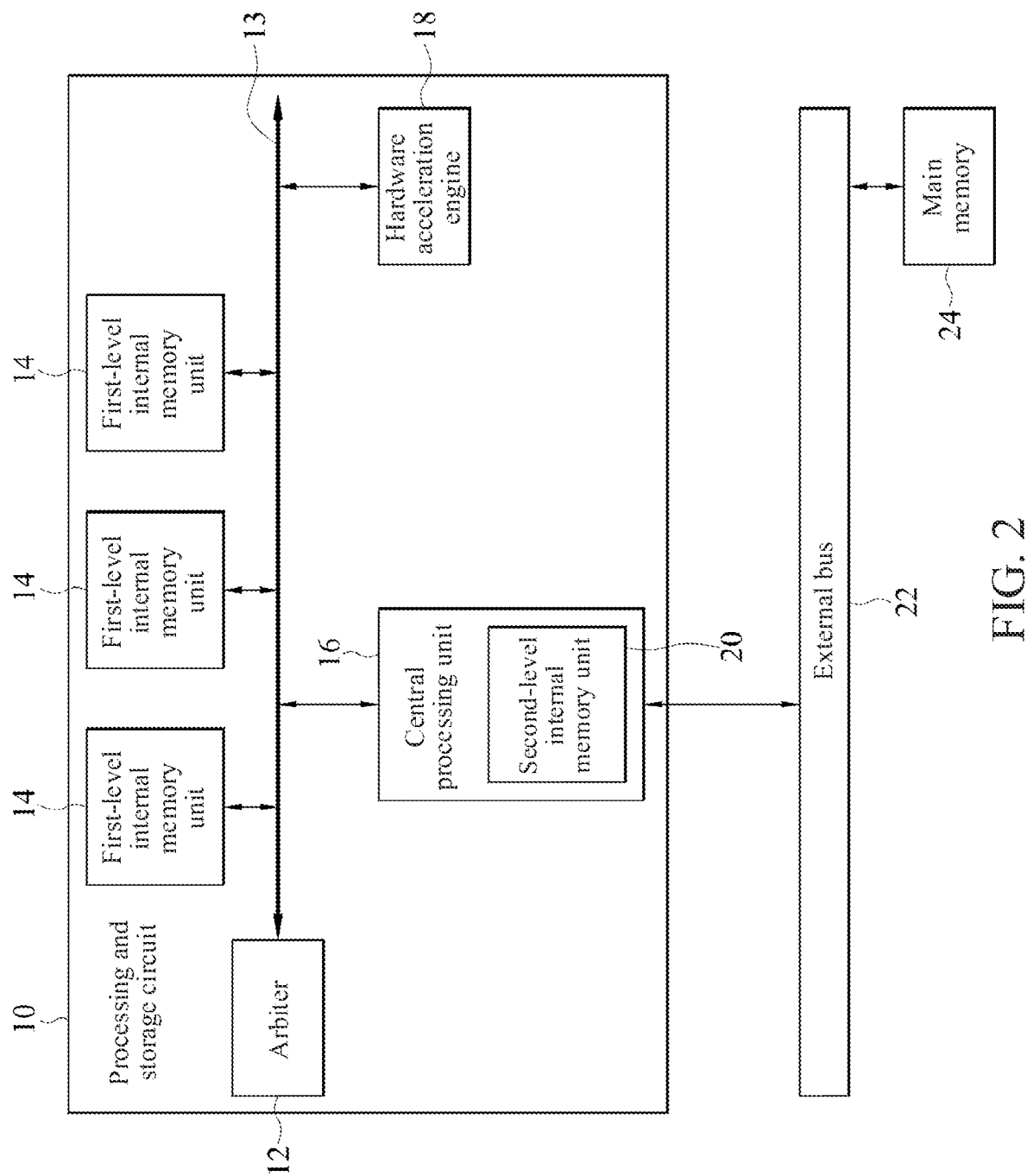
FIG. 2 is a schematic block diagram of a processing and storage circuit according to an embodiment of the present invention.

FIG. 2 is a schematic block diagram of a processing and storage circuit according to an embodiment of the present invention. Referring to FIG. 2, a processing and storage circuit 10 includes an arbiter 12, an internal bus 13, at least one first-level internal memory unit 14, a CPU 16, and at least one hardware acceleration engine 18. The arbiter 12, the first-level internal memory unit 14, the CPU 16, and the hardware acceleration engine 18 are coupled to the internal bus 13. In this embodiment, for example, there are three first-level internal memory units 14, but the present invention is not limited thereto. The CPU 16 includes a second-level internal memory unit 20. The CPU 16 is configured to access the first-level internal memory unit 14 and the second-level internal memory unit 20. The CPU 16 accesses data in the first-level internal memory unit 14 through the internal bus 13. When the CPU 16 accesses data, the data in the first-level internal memory unit 14 is accessed preferentially, and then the second-level internal memory unit 20 in the CPU 16 is accessed. The hardware acceleration engine 18 is coupled to the first-level internal memory unit 14 via the internal bus 13, to directly access the data in the first-level internal memory unit 14 through the internal bus 13. The arbiter is configured to decide whether the CPU 16 or the hardware acceleration engine 18 be allowed to access the first-level internal memory unit 14. The arbiter 12 sets the priority of the CPU 16 accessing the first-level internal memory unit 14 to be over the hardware acceleration engine 18. Therefore, when the CPU 16 and the hardware acceleration engine 18 are to simultaneously access the same first-level internal memory unit 14, the arbiter 12 determines that the CPU 16 preferentially accesses the first-level internal memory unit 14. After the CPU 16 completes the access, then it is the turn of the hardware acceleration engine 18 to access the first-level internal memory unit 14.

Because the first-level internal memory unit 14 initially disposed in the CPU 16 has been transferred outside the CPU 16 and is connected to the internal bus 13, the capacity of the first-level internal memory unit 14 can be expanded according to designing requirements. Certainly, the capacity of the first-level internal memory unit 14 may not be less than (equal to or greater than) the capacity of the second-level internal memory unit 20 in the CPU 16. Both the CPU 16 and the hardware acceleration engine 18 can directly access the first-level internal memory unit 14 through the internal bus 13 according to the arbiter 12, to reduce the time that the CPU 16 and the hardware acceleration engine 18 take to access data.

In an embodiment, because there are a plurality of first-level internal memory units 14, for example, three first-level internal memory units 14 shown in FIG. 2, the CPU 16 may preferentially access one of the first-level internal memory units 14 through the internal bus 13 to access data. The first-level internal memory units 14 may be internal memories with the same size and specification, or may be internal memories with different sizes and specifications, which are determined according to actual use states. An averagely shorter access delay of both the CPU 16 and the hardware acceleration engine 18 can be implemented under the cooperation of first-level internal memory unit 14 and the arbiter 12. Therefore, the hardware acceleration engine 18 accesses the first-level internal memory unit 14 through the internal bus 13 instead of the external bus 22 to reduce the delay of accessing data on the external bus 22.

In an embodiment, the CPU 16 is further coupled to an external bus 22. A main memory 24 is also coupled to the external bus 22 for the CPU 16 to access data in the main memory 24 through the external bus 22. In an embodiment, the main memory 24 is a non-volatile internal memory, such as an SSD, configured to store data. In an embodiment, the external bus 22 is of an open core protocol (OCP) architecture or an advanced microcontroller bus architecture (AMBA).

Figure 3:
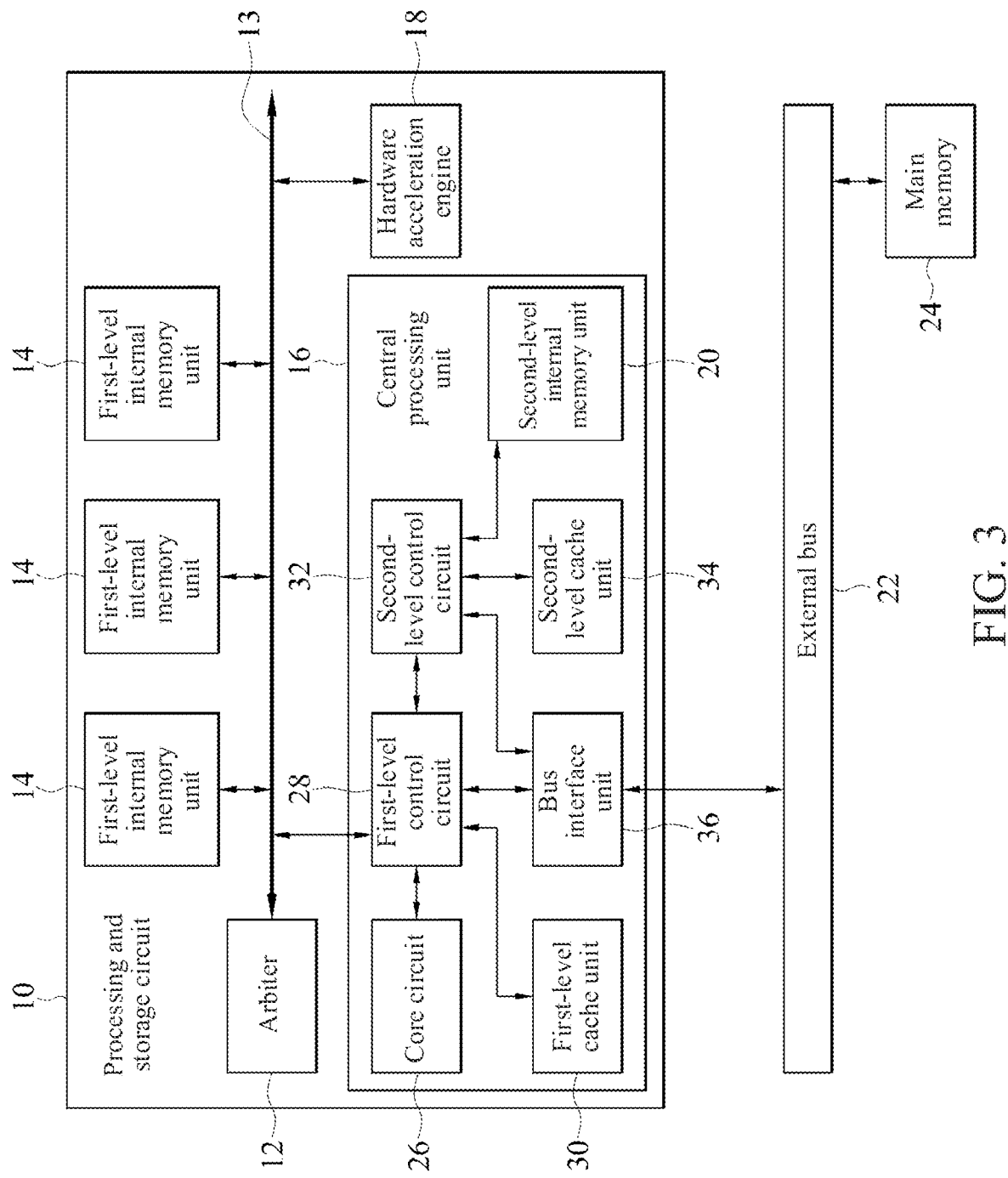
FIG. 3 is a schematic block diagram of a CPU according to an embodiment of the present invention.

Referring to FIG. 2 and FIG. 3, in an embodiment, the CPU 16 includes a core circuit 26, a first-level control circuit 28, a first-level cache unit 30, a second-level control circuit 32, the foregoing second-level internal memory unit 20, a second-level cache unit 34, and a bus interface unit (BIU) 36. The first-level control circuit 28 is coupled to the core circuit 26 and the internal bus 13, so that the core circuit 26 preferentially accesses the data in the first-level internal memory unit 14 through the first-level control circuit 28 and the internal bus 13. The first-level cache unit 30 is also coupled to the first-level control circuit 28, so that the core circuit 26 accesses the first-level cache unit 30 through the first-level control circuit 28. The second-level control circuit 32 is coupled to the first-level control circuit 28, the second-level internal memory unit 20, and the second-level cache unit 34, so that the core circuit 26 accesses the second-level internal memory unit 20 or the second-level cache unit 34 through the second-level control circuit 32. The BIU 36 is coupled to the first-level control circuit 28, the second-level control circuit 32, and the external bus 22, so that the first-level control circuit 28 and the second-level control circuit 32 are coupled to the external bus 22 through BIU 36 to perform signal transmission or data accessing. The first-level internal memory unit 14, the first-level cache unit 30, the second-level internal memory unit 20, and the second-level cache unit 34 are non-volatile memories, such as, static random access memories (SRAMs), and therefore the foregoing units have a feature of high access speed. By using the feature, data of a program which needs to be run is copied from the main memory 24 and buffered in the first-level internal memory unit 14, the first-level cache unit 30, the second-level internal memory unit 20, or the second-level cache unit 34, so that the core circuit 26 and the hardware acceleration engine 18 can quickly access data. Besides, the access-priority sequence of the core circuit 26 accessing data is the first-level internal memory unit 14, the first-level cache unit 30, the second-level internal memory unit 20, and the second-level cache unit 34 in order.

Figure 4:
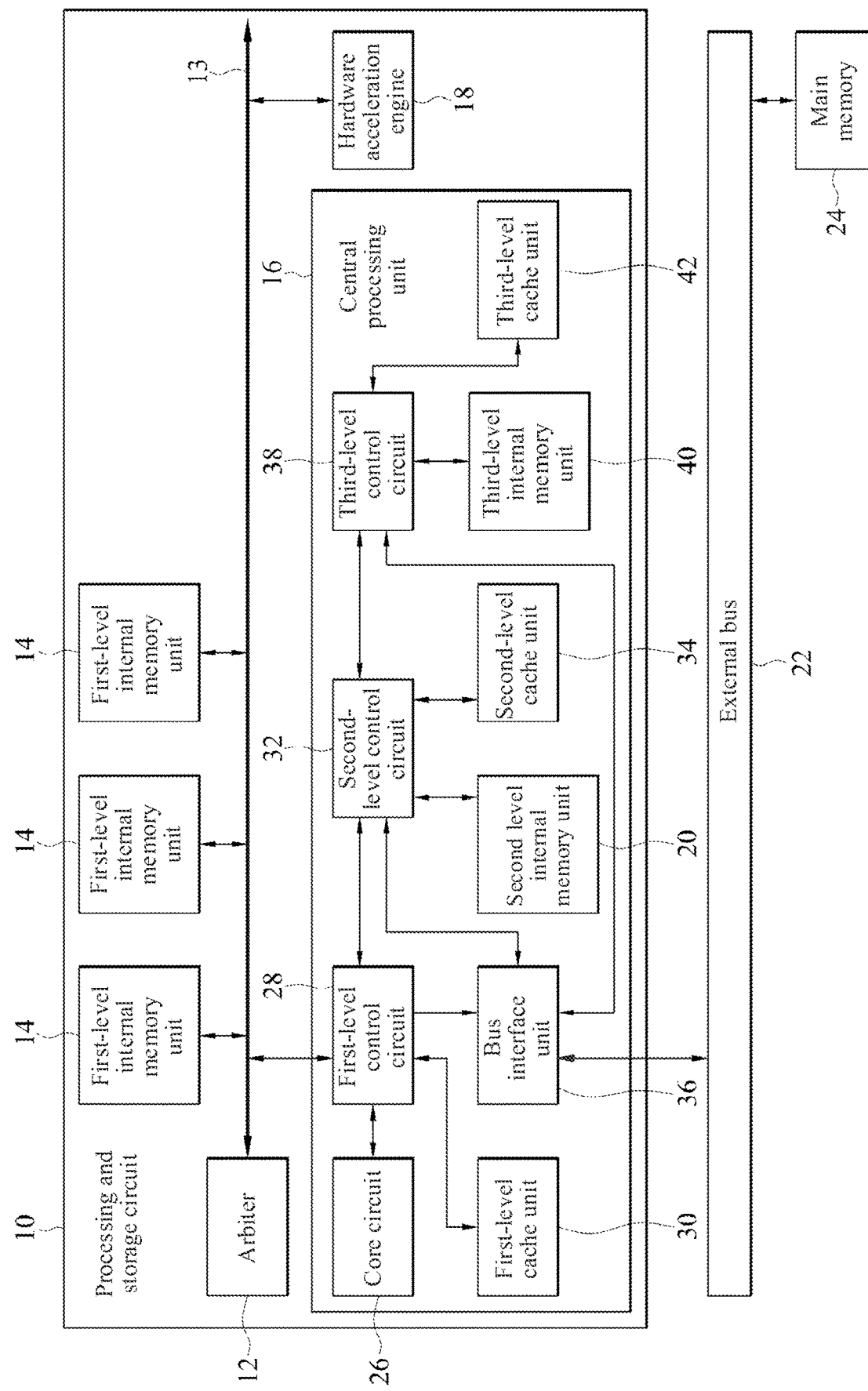
FIG. 4 is a schematic block diagram of a CPU according to another embodiment of the present invention.

Referring to FIG. 2 and FIG. 4, in another embodiment, the CPU 16 further includes a third-level control circuit 38, a third-level internal memory unit 40, and a third-level cache unit 42. The third-level control circuit 38 is disposed between the second-level control circuit 32 and the BIU 36, and coupled to the second-level control circuit 32, the BIU 36, the third-level internal memory unit 40, and the third-level cache unit 42, so that the core circuit 26 accesses the third-level internal memory unit 40 or the third-level cache unit 42 through the third-level control circuit 38. The third-level internal memory unit 40 and the third-level cache unit 42 are also non-volatile memories, such as SRAMs. Besides, the access-priority sequence of the core circuit 26 accessing data is the first-level internal memory unit 14, the first-level cache unit 30, the second-level internal memory unit 20, the second-level cache unit 34, the third-level internal memory unit 40, and the third-level cache unit 42 in order. The capacity of the second-level internal memory unit 20 is less than the capacity of the third-level internal memory unit 40. Because the first-level internal memory unit 14 is disposed outside the CPU 16, the capacity of the first-level internal memory unit 14 may be less than or not less than (equal to or greater than) the capacity of the third-level internal memory unit 40 in the CPU 16.

In an embodiment, referring to FIG. 3 and FIG. 4, the first-level control circuit 28 further includes an instruction control circuit and a data control circuit (not shown in the figures). The first-level internal memory unit 14 includes an instruction internal memory unit and a data memory unit (not shown in the figures). The first-level cache unit 30 includes an instruction cache unit and a data cache unit (not shown in the figures). The instruction control circuit is coupled to the instruction internal memory unit and the instruction cache unit. The data control circuit is coupled to data memory unit and the data cache unit.

Figure 5:
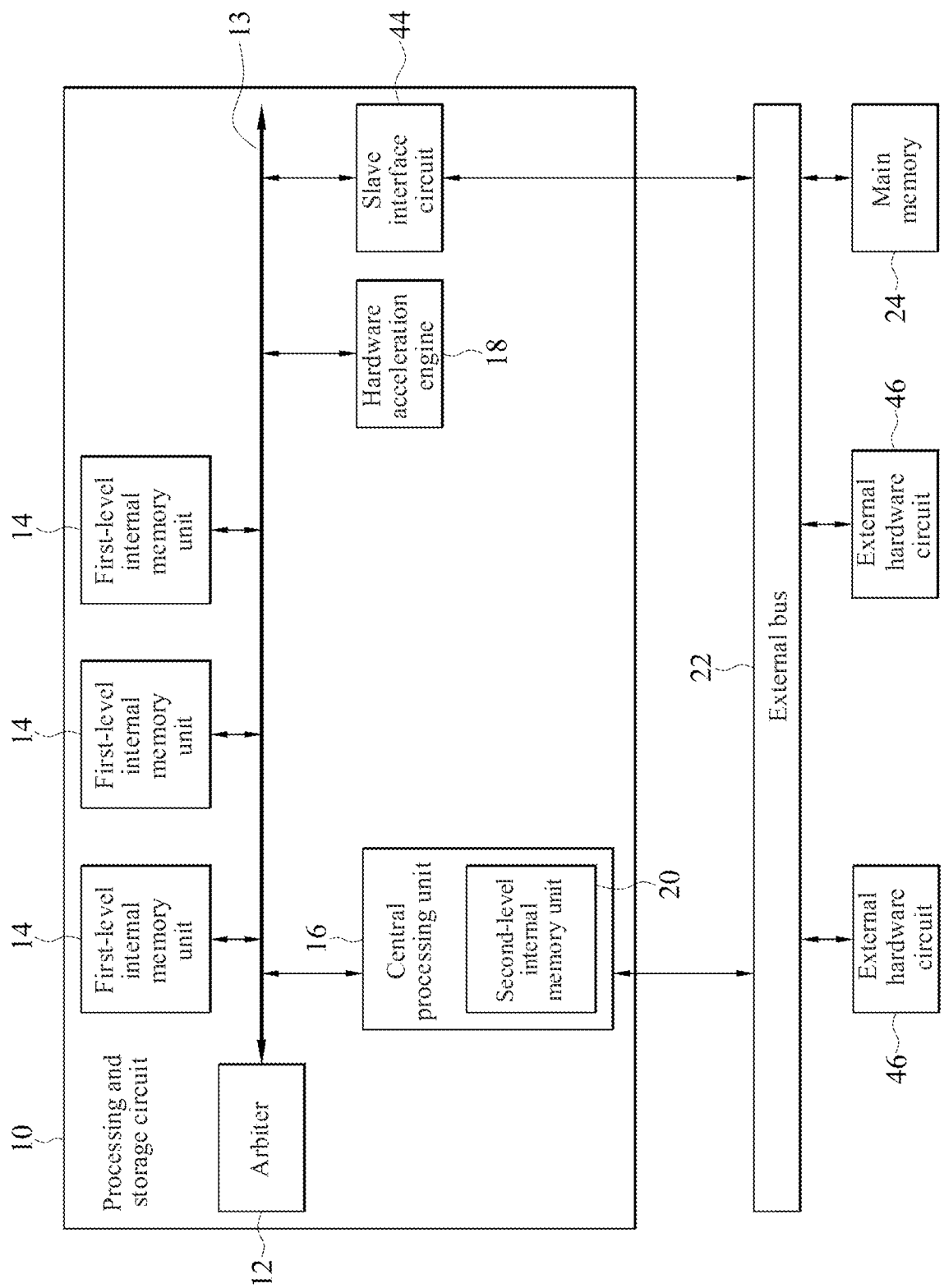
FIG. 5 is a schematic block diagram of a processing and storage circuit according to another embodiment of the present invention.

In order to increase the use flexibility, in the present invention, a slave interface circuit 44 is added in the processing and storage circuit 10. Referring to FIG. 5, the processing and storage circuit 10 includes the arbiter 12, the internal bus 13, the first-level internal memory unit 14, the CPU 16, the hardware acceleration engine 18, and the slave interface circuit 44. The arbiter 12, the first-level internal memory unit 14, the CPU 16, the hardware acceleration engine 18, and the slave interface circuit 44 are coupled to the internal bus 13. The slave interface circuit 44 is coupled to between the internal bus 13 and the external bus 22, so that an external hardware circuit 46 that is coupled to the external bus 22 can access the data in the first-level internal memory unit 14 through the external bus 22, the slave interface circuit 44, and the internal bus 13. In addition, the arbiter 12 sets the priority of the CPU 16 accessing the first-level internal memory unit 14 to be over the hardware acceleration engine 18 and the slave interface circuit 44. Therefore, in the present invention, the newly added slave interface circuit 44 enables the external hardware circuit 46 on the external bus 22 to also access, through the external bus 22, the data in the first-level internal memory unit 14, instead of the bus interface unit 36 to reduce the delay of accessing data on the external bus 22. For example, in an application in which the main memory 24 is an SSD, the firmware of the CPU 16 transmits table data stored in the main memory 24 through the external bus 22, and the internal bus 13 to the first-level internal memory unit 14 for buffering, and then drives the hardware acceleration engine 18 to directly access, through the internal bus 13, the table data in the first-level internal memory unit 14 for acceleration, to obtain a final processing result.

In an embodiment, the processing and storage circuit 10, the external bus 22, and the at least one external hardware circuit 46 are located in a system on chip (SOC).

Figure 6:
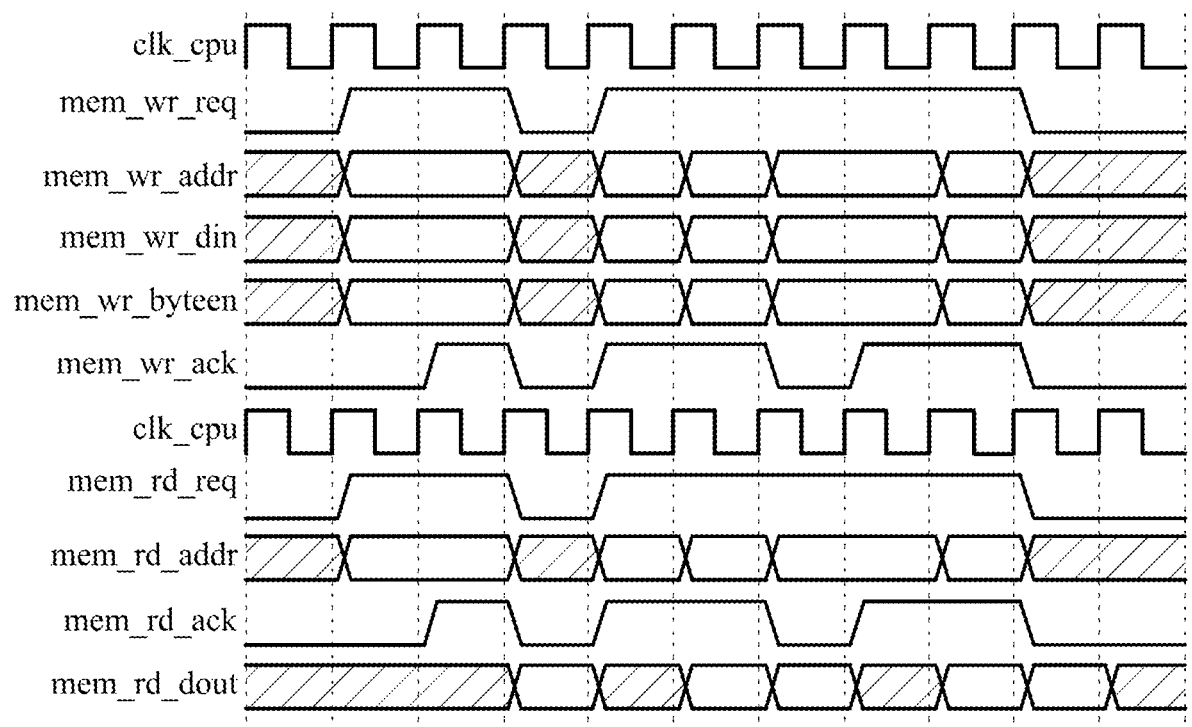
FIG. 6 is a schematic timing diagram of an arbiter according to an embodiment of the present invention.

Based on the above, in the processing and storage circuit 10 shown in FIG. 2, both the CPU 16 and the hardware acceleration engine 18 access the first-level internal memory unit 14 through the internal bus 13, and the access priority is set by the arbiter 12. In the processing and storage circuit 10 shown in FIG. 5, the CPU 16, the hardware acceleration engine 18, and the slave interface circuit 44 all access the first-level internal memory unit 14 through the internal bus 13, and the access priority is set by the arbiter 12. Specific timing of actuation of the arbiter 12 is shown in FIG. 6, and can be used in coordination with the frequency of the CPU 16 (clk_cpu) for writing and reading.

In an embodiment, referring to FIG. 5, when the hardware acceleration engine 18 and the slave interface circuit 44 simultaneously access the first-level internal memory unit 14, the arbiter 12 sets the hardware acceleration engine 18 and the slave interface circuit 44 to perform alternate access, to alternately access the first-level internal memory unit 14.

In an embodiment, the external hardware circuit 46 may be a general direct memory access (DMA) controller, a flash controller, a peripheral component interconnect express (PCIe) controller, or the like, but the present invention is not limited thereto.

In an embodiment, as shown in FIG. 2 or FIG. 5, because the first-level internal memory unit 14 is disposed outside the CPU 16, the CPU 16 with only one internal memory port merely needs a corresponding operation interface signal. In another embodiment, the processing and storage circuit 10 is a multi-core circuit, that is, there are a plurality of (at least two) CPUs 16 in the processing and storage circuit 10. Each CPU 16 is provided with one internal memory port. Therefore, there are a plurality of internal memory ports. The internal memory ports are coupled to the first-level internal memory unit 14 through the internal bus 13 to access the first-level internal memory unit 14. In this case, the CPU 16 may implement a handshake protocol through a halt signal to process a situation that the internal memory ports access the same first-level internal memory unit 14, that is, to coordinate, according to the halt signal, the internal memory ports to access the same first-level internal memory unit 14 alternately.

A difference between the present invention and the prior art can be understood more easily by simulation. Relevant content and experimental data during simulation are merely for exemplary purposes, and do not limit the present invention. In a simulation setting, the frequency of the CPU is 700 MHz. The frequency of the bus is 280 MHz. An example that the hardware acceleration engine is a write cache mapping table (WCMT) hardware acceleration engine is used. The write cache mapping table hardware acceleration engine is configured to process a WCMT. For an existing processing and storage circuit, a WCMT hardware acceleration engine can access data only through a bus. Simulation is performed on the existing processing and storage circuit without tight coupling in FIG. 1, to simulate time that the circuit takes to read and write. The simulation result shows that reading a batch of data consumes 43 ns (the frequency in this case is 280 MHz) and writing a batch of data consumes 25 ns (the frequency in this case is 280 MHz). Each time the WCMT is started, approximately 5000 times of reading and 3000 times of writing are needed. Therefore, even if the WCMT avoids part of Input/Output latency (IO latency) by way of acceleration, the actual entire execution consumes approximately 103 µs. On the other hand, under the same conditions, simulation is performed on the processing and storage circuit with tight coupling in the present invention. The WCMT hardware acceleration engine and the CPU share the first-level internal memory unit through the internal bus. Time that the circuit takes to read and write is simulated. The simulation result shows that reading a batch of data consumes 1.4 ns (the frequency in this case is 700 MHz) and writing a batch of data consumes 2.8 ns (the frequency in this case is 700 MHz). The actual entire execution consumes only approximately 13 µs. The time is far less than the time (103 µs) that the existing circuit takes. Therefore, the present invention indeed can achieve the effect of reducing the time overheads caused when the CPU and the hardware acceleration engine access data.

In summary, the present invention is an implementation of high-performance data tight-coupling and acceleration, to improve the speed of data accessing by a CPU and a hardware acceleration engine by way of a change in a hardware design. Compared to the prior art, the present invention can directly improve the performance without modifying algorithms, and also takes consideration of design flexibility, facilitating development of more efficient acceleration solutions. Therefore, in the present invention, with the access speed of the CPU being ensured, the hardware acceleration engine and the internal memory (the first-level internal memory unit) are tightly coupled in terms of physical implementation to effectively reduce the time overheads caused when the CPU and the hardware acceleration engine access data, and optimize the delay of a data path, thereby further improving the performance of the hardware acceleration engine.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A processing and storage circuit, comprising:
an internal bus;
at least one first-level internal memory unit, coupled to the internal bus;
at least one central processing unit (CPU), coupled to the at least one first-level internal memory unit via the internal bus, comprising a second-level internal memory unit, wherein the CPU is configured to access the first-level internal memory unit and the second-level internal memory unit, and wherein when the CPU accesses data, the first-level internal memory unit is accessed preferentially;
at least one hardware acceleration engine, coupled to the at least one first-level internal memory unit via the internal bus, configured to access the first-level internal memory unit; and
an arbiter, coupled to the internal bus, configured to decide whether the CPU or the hardware acceleration engine be allowed to access the at least one first-level internal memory unit;
wherein the arbiter sets the priority of the CPU accessing the first-level internal memory unit to be over the hardware acceleration engine; and
wherein the processing and storage circuit comprises a bus interface unit, coupled to at least one external hardware circuit via an external bus, and a slave interface circuit, coupled between the internal bus and the external bus.

2. The processing and storage circuit according to claim 1, wherein the capacity of the first-level internal memory unit is not less than the capacity of the second-level internal memory unit.

3. The processing and storage circuit according to claim 1, wherein the at least one external hardware circuit accesses the first-level internal memory unit through the slave interface circuit instead of the bus interface unit to reduce the delay of accessing data on the external bus.

4. The processing and storage circuit according to claim 1, wherein the arbiter sets the hardware acceleration engine and the slave interface circuit to alternately access the first-level internal memory unit.

5. The processing and storage circuit according to claim 1, wherein the processing and storage circuit, the external bus, and the at least one external hardware circuit are located in a system on chip (SOC).

6. The processing and storage circuit according to claim 5, wherein the at least one hardware acceleration engine accesses the first-level internal memory unit through the internal bus instead of the external bus to reduce the delay of accessing data on the external bus.

7. The processing and storage circuit according to claim 5, wherein the SOC is used in a storage device product.

8. The processing and storage circuit according to claim 1, wherein the at least one external hardware circuit comprises at least one of a general direct memory access (DMA) controller, a flash controller, a peripheral component interconnect express (PCIe) controller.

9. The processing and storage circuit according to claim 1, wherein the external bus is an open core protocol (OCP) architecture.

10. The processing and storage circuit according to claim 1, wherein the external bus is an advanced microcontroller bus architecture (AMBA).

11. The processing and storage circuit according to claim 1, wherein the hardware acceleration engine and the CPU share the first-level internal memory unit.

12. The processing and storage circuit according to claim 1, wherein the hardware acceleration engine is configured to update a write cache mapping table (WCMT).

13. The processing and storage circuit according to claim 1, wherein a timing of actuation of the arbiter uses in coordination with a frequency of the CPU.

14. A processing and storage circuit, comprising:
an internal bus;
at least one first-level internal memory unit, coupled to the internal bus;
at least one central processing unit (CPU), coupled to the at least one first-level internal memory unit via the internal bus, comprising a second-level internal memory unit, wherein the CPU is configured to access the first-level internal memory unit and the second-level internal memory unit, and wherein when the CPU accesses data, the first-level internal memory unit is accessed preferentially;
at least one hardware acceleration engine, coupled to the at least one first-level internal memory unit via the internal bus, configured to access the first-level internal memory unit; and
an arbiter, coupled to the internal bus, configured to decide whether the CPU or the hardware acceleration engine be allowed to access the at least one first-level internal memory unit;
wherein the arbiter sets the priority of the CPU accessing the first-level internal memory unit to be over the hardware acceleration engine, wherein the CPU further comprises:
a core circuit;
a first-level control circuit, coupled to the core circuit and the internal bus, wherein the core circuit access the first-level internal memory unit through the first-level control circuit;
a first-level cache unit, coupled to the first-level control circuit, so that the core circuit accesses the first-level cache unit through the first-level control circuit;
a second-level control circuit, coupled to the first-level control circuit;
the second-level internal memory unit, coupled to the second-level control circuit, so that the core circuit accesses the second-level internal memory unit through the second-level control circuit;
a second-level cache unit, coupled to the second-level control circuit, so that the core circuit accesses the second-level cache unit through the second-level control circuit; and
a bus interface unit, coupled to the first-level control circuit, the second-level control circuit, and the external bus.

15. The processing and storage circuit according to claim 14, wherein the access sequence of the core circuit for accessing data is the first-level internal memory unit, the first-level cache unit, the second-level internal memory unit, and the second-level cache unit in order.

16. A processing and storage circuit, comprising:
an internal bus;
at least one first-level internal memory unit, coupled to the internal bus;
at least one central processing unit (CPU), coupled to the at least one first-level internal memory unit via the internal bus, comprising a second-level internal memory unit, wherein the CPU is configured to access the first-level internal memory unit and the second-level internal memory unit, and wherein when the CPU accesses data, the first-level internal memory unit is accessed preferentially;

at least one hardware acceleration engine, coupled to the at least one first-level internal memory unit via the internal bus, configured to access the first-level internal memory unit; and an arbiter, coupled to the internal bus, configured to decide whether the CPU or the hardware acceleration engine be allowed to access the at least one first-level internal memory unit;

wherein the arbiter sets the priority of the CPU accessing the first-level internal memory unit to be over the hardware acceleration engine, wherein there are at least two CPUs which comprise a plurality of internal memory ports, the internal memory ports are coupled to the first-level internal memory unit through the internal bus, and the at least two CPUs further implements a handshake protocol through a halt signal to process a situation that the internal memory ports access the same first-level internal memory unit.

17. The processing and storage circuit according to claim 16, wherein when there are a plurality of first-level internal memory units, one of the at least two CPUs accesses one of the first-level internal memory units through the internal bus to access data.

* * * * *